Patented June 15, 1926.

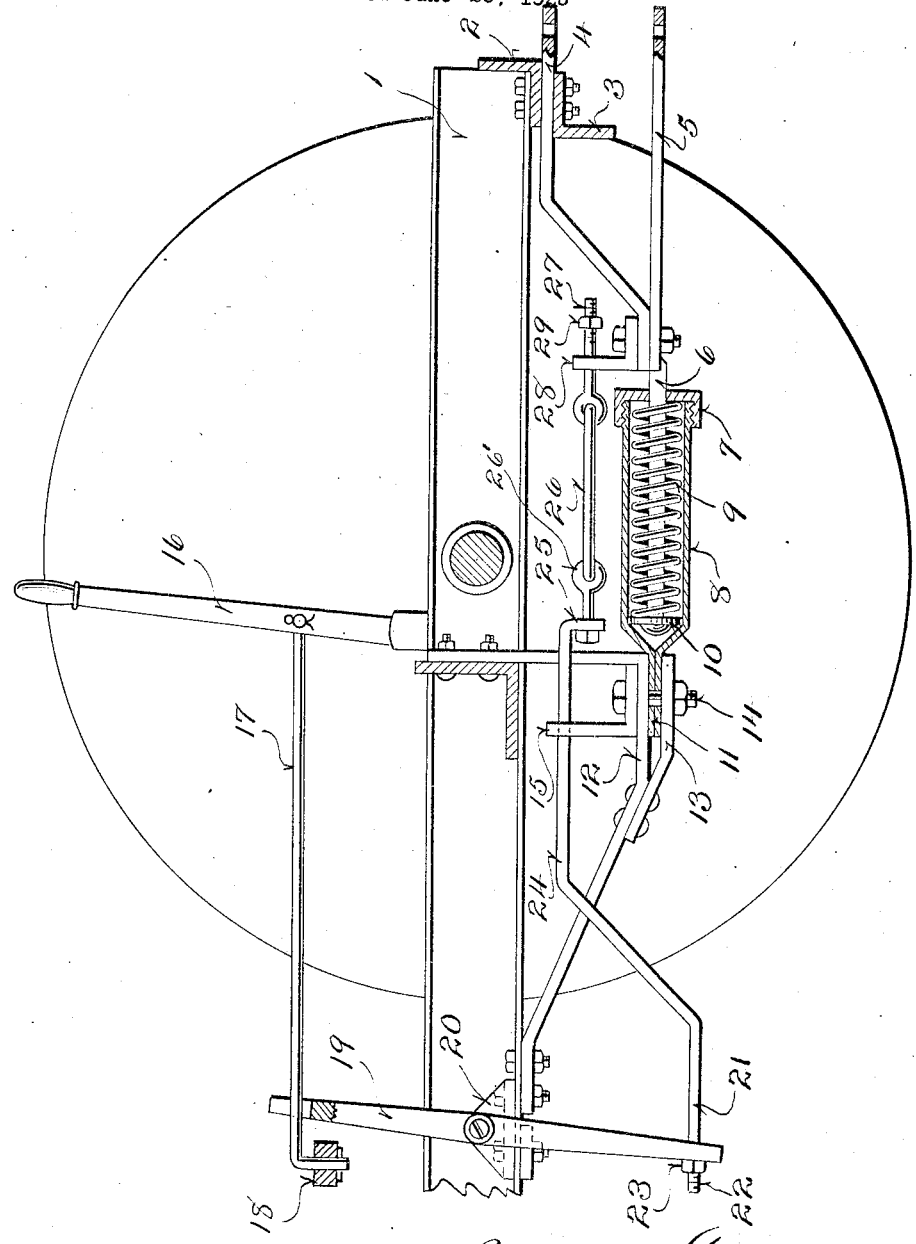

1,589,061

UNITED STATES PATENT OFFICE.

WILLIAM H. FIRARI, OF NORTH LOWELL, WISCONSIN.

DRAWBAR-CLUTCH CONTROL.

Application filed June 26, 1925. Serial No. 39,712.

This invention relates to a draw bar clutch control and is particularly directed to a draw bar clutch control for tractors.

Objects of this invention are to provide a draw bar clutch control which may be applied to standard tractors with a minimum of change, and which is so constructed that when the draft upon the draw bar exceeds a predetermined value, it will automatically open the clutch and prevent the imposition of excessive strains upon the mechanism.

Further objects are to provide a draw bar clutch control which does not interfere with the action of the tractor in any manner, but which permits the tractor to be used in the usual capacity with the additional security of an automatic release for excessive loads.

Further objects are to provide a draw bar clutch control which may be very cheaply constructed primarily from standard material, and which affords a yielding cushion support for the draw bar, thus minimizing shocks and jars to this portion of the apparatus.

An embodiment of the invention is shown in the accompanying drawings, in which:—

The single figure is a sectional elevation showing a portion of the tractor and showing the device applied thereto.

The device is applicable to standard types of tractors and the tractor upon which it is shown in the drawing is of the type known as the Hart-Parr tractor.

Referring to the drawings, it will be seen that the side frame bars 1 are provided with an upper and a lower angle iron 2 and 3, respectively, between which the upper member 4 of the draw bar is slidably carried. This upper portion is bolted to a lower portion 5 of the draw bar, and each of these members are apertured to receive the attaching pin for the load. The draw bars are secured to a plunger 6 which passes through a cap 7 and into a cylinder 8.

A compression spring 9 loosely surrounds the plunger 6 and is housed within the cylinder 8. It bears at its outer end against a head 10 of the plunger 6. In making this cylinder, it has been found convenient to form it of pipe which is slotted and has its end portion pressed together, as indicated at 11. This end portion is positioned between the outwardly projecting portion 12 of the diagonal brace and an under clip 13. It is pivotally held in position by means of a bolt 14. It is to be noted in this connection that the bolt also holds a bracket 15 which is apertured for a purpose hereinafter to appear.

The usual clutch lever is indicated at 16 and is provided with the usual clutch rod 17 whose outer end is pivotally positioned within the end of the operating lever 18 for the clutch, such mechanism being of conventional construction.

A lever 19 is pivotally carried by a supporting bearing 20 attached to a stationary portion of the machine and having a bifurcated upper end surrounding the rod 17 and permitting free sliding motion of the rod therethrough. The lower end of the lever is attached to a rod 21 and this attachment may be secured by passing a threaded portion 22 of the rod through a suitable aperture in the lower portion of the lever 19, an adjusting nut 23 being provided for securing the desired adjustment of the rod relative to the lever. The rear portion of this rod is offset from the forward portion 21 and such offset portion 24 extends in a horizontal direction through the guiding bracket 15. It is provided with a downturned end 25 which is apertured and receives the eye bolt 26'. A link 26 is pivoted at one end in the eye bolt and such link is connected to an eye bolt 27 which is freely slidable in a bracket 28 carried by the draw bar 6. The eye bolt 27 is provided with an adjusting nut 29 which is adapted to be set towards or from the bracket to secure the adjustment at which the clutch will open for a predetermined load. It is to be understood that a cable may be substituted for the link 26 if desired.

The operation of the apparatus is as follows:—A load is connected to the draw bar and the tractor is started. If the load is of normal amount and does not exceed a predetermined value, the tractor operates in the usual capacity, the spring 9 merely yielding slightly and cushioning the load. However, if the load exceeds a predetermined value, the plunger 6 is pulled rearwardly and the bracket 28 contacts with the adjusting nut 29. This rocks the lever 19 in a counter clockwise direction and trips the clutch, thus relieving the mechanism of excess stresses.

It will be seen that a very simple type of device has been provided which may be attached to a standard tractor with a minimum of effort, and which is highly effective in operation and protects the entire mechanism from unusual or excessive strains.

Although the invention has been described in considerable detail, it is to be understood that the invention may be variously embodied and is, therefore, to be limited only as claimed.

I claim:

1. The combination of a tractor having a clutch lever, an operating lever, a clutch rod connecting said levers, a vertical lever pivoted intermediate its ends and having its upper end slidably associated with said clutch rod and adapted to move said first mentioned levers, a link connected to the lower end of said vertical lever, a spring housing carried by a stationary portion of said tractor, a draw bar adapted to compress said spring when a load is placed upon such draw bar, and a bracket cooperating with said link to rock said vertical lever and thereby actuate said clutch lever.

2. The combination of a tractor, a member rigidly carried thereby and having a pintle bolt therein, a tube having a flattened portion pivoted to said pintle bolt, a compression spring carried within said tube, a draw bar cooperating with said compression spring and having a bracket thereon, clutch mechanism carried by said tractor, a vertical lever adapted to move said clutch mechanism into clutch open position, and a link connected to one end of said vertical lever and having an adjustable stop adapted to be engaged by said bracket when the load on said draw bar exceeds a predetermined value.

In testimony that I claim the foregoing I have hereunto set my hand at Reeseville, in the county of Dodge and State of Wisconsin.

WILLIAM H. FIRARI.